(No Model.)

J. P. WARNER.
AXLE FOR VEHICLES.

No. 265,196. Patented Sept. 26, 1882.

Attest.
John C Perkins
Ada C Warner

Inventor.
Jasper P Warner
By Roscoe B Wheeler
Att'y

UNITED STATES PATENT OFFICE.

JASPER P. WARNER, OF DOWAGIAC, MICHIGAN.

AXLE FOR VEHICLES.

SPECIFICATION forming part of Letters Patent No. 265,196, dated September 26, 1882.

Application filed June 14, 1882. (No model.)

*To all whom it may concern:*

Be it known that I, JASPER P. WARNER, of the city of Dowagiac, county of Cass, and State of Michigan, have invented a certain improvement in adjustable axle-couplings for the purpose of extending or shortening axles, thus placing the driving-wheels close together or apart, for the purposes hereinafter described in the following specification.

In order to aid others skilled in the art to which my invention belongs to make and use it, I will proceed to describe its construction and operations with reference to the several drawings forming a part of this specification, in which—

Figure 1:
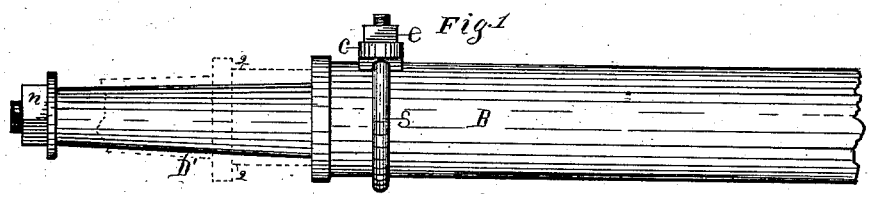
Figure 2:
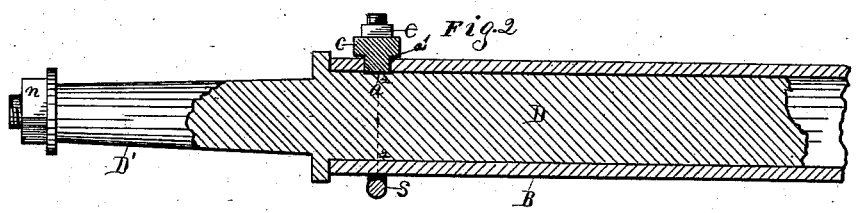
Figure 3:
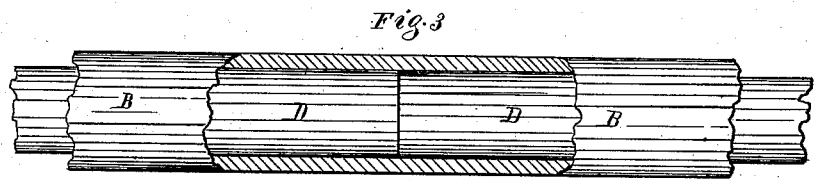
Figure 4:
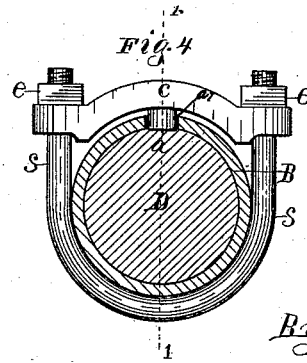

Figure 1 is a side elevation of the axle-couplings, showing also by dotted lines, Fig. 2, the inner axle as drawn or extended. Fig. 2 is a longitudinal sectional view of Fig. 1 on line 1 1 of Fig. 4. Fig. 3 is a central view of the axle having the ends broken off and the outer part, B, at the center cut away to show the manner in which the extending parts D are placed when the axle is narrowed or shortened. Fig. 4 is a cross-sectional or end view, showing the pipe B and axle D cut off, also giving a side view of the yoke C with pintle $a$ passing through a round hole, $a'$, in the pipe B and resting upon the inner or extending part, D, showing also the clip S passing around the pipe B and up through the yoke C, being held in position by the nuts $e$ $e$.

The object of this invention is to devise a simple, cheap, and durable coupling adjustable axle designed for agricultural machines of that class that may be widened out sufficiently to carry a large number of pulverizers, known as "harrow-teeth" or "cultivator-points," as in harrowing the soil a wide machine is very desirable, and being able to narrow the machine, placing the driving-wheels sufficiently near each other to form a cultivator on wheels that will readily work between the rows of corn, I am able to use in both machines the same wheels, tongue, and frame, requiring in a cultivator only a less number of teeth or points. By this arrangement I am able at a small expense to make one machine do two kinds of work.

I will describe the parts constituting my axle and adjustments. The outer central part, B, is hollow. I use for this heavy gas-pipe. Into each end of the pipe is inserted a round iron axle, D, and upon the extreme ends D' the drive-wheels turn. Near each end of the tube B a small hole, $a'$, is drilled, as shown in Figs. 2 and 4. These holes are about five-eighths of an inch across and are through one side only of the pipe. Fitting over the pipe I employ a yoke, C. This yoke is arching in the center, and is provided with a hole at each end; and passing around the pipe B and up through the yoke C is a clip, S, being secured to the yoke by two nuts, $e$ $e$. The yoke is made of malleable iron, and is provided at the center with a round projection or pintle, $a$, which passes through the hole $a'$ of the tube B. (See Fig. 4.) The end of the pintle $a$ forms a bearing upon the inner axle, D, so that when the nuts $e$ $e$ are tightened the pintle $a$ is forced against the inner axle, thus binding it rigidly to the hollow or outer part, B, making a solid coupling. The pintle $a$ is somewhat longer than the thickness through the part B, in order that it may press rigidly upon the inner part, D, leaving the under surface of the yoke C slightly above the tube B, as clearly shown in Fig. 4. The pintle $a$, passing through the hole $a'$, prevents the yoke C and clip from sliding out of place on the pipe B. To extend the axle or widen the machine, I loosen the nuts $e$ $e$, when the pressure upon the inner axle, D, is released. Then drawing out the axle D and tightening the nuts, the machine will be widened in the manner shown by dotted lines 2 2 of Fig. 1, and reversing the above movements will narrow the machine to the positions clearly indicated in Figs. 1 and 2.

Having thus clearly described my invention in the most exact terms that I can give, what I claim as new, and desire Letters Patent therefor, is—

The adjustable axle-coupling, consisting of the central tube, B, inner movable parts, D, clip S, and yoke C, having pintle $a$, engaging with the hole $a'$ of the tube B, as and for the purposes specified.

JASPER P. WARNER.

Witnesses:
ROSCOE B. WHEELER,
ADA C. WARNER.